(12) United States Patent  
Higuchi et al.

(10) Patent No.: US 7,760,402 B2  
(45) Date of Patent: Jul. 20, 2010

(54) IMAGE PROCESSING APPARATUS AND IMAGE PROCESSING METHOD

(75) Inventors: Takafumi Higuchi, Matsumoto (JP); Yuichi Kimura, Higashiosaka (JP)

(73) Assignee: Seiko Epson Corporation, Tokyo (JP)

( * ) Notice: Subject to any disclaimer, the term of this patent is extended or adjusted under 35 U.S.C. 154(b) by 744 days.

(21) Appl. No.: 11/701,692

(22) Filed: Feb. 1, 2007

(65) Prior Publication Data

US 2008/0002233 A1    Jan. 3, 2008

(30) Foreign Application Priority Data

Feb. 1, 2006    (JP)    ............................. 2006-024218

(51) Int. Cl.
*H04N 1/00* (2006.01)
*H04N 1/04* (2006.01)
*H04N 1/32* (2006.01)

(52) U.S. Cl. ........................ 358/401; 358/400; 358/468; 358/474

(58) Field of Classification Search .................. 358/400, 358/402, 404, 444, 442, 471, 468, 443, 474, 358/1.15, 1.16; 379/100.01, 100.08, 100.09; 717/526, 525, 148; 715/527
See application file for complete search history.

(56) References Cited

U.S. PATENT DOCUMENTS

| 5,386,566 | A | * | 1/1995 | Hamanaka et al. | .......... 719/310 |
| 6,134,017 | A | * | 10/2000 | Schlank et al. | ............. 358/1.15 |
| 2005/0114766 | A1 | * | 5/2005 | Yamamoto | .................. 715/527 |
| 2009/0150873 | A1 | * | 6/2009 | Taneda | ........................ 717/148 |

FOREIGN PATENT DOCUMENTS

JP    2002-084383    3/2002

* cited by examiner

*Primary Examiner*—Jerome Grant, II
(74) *Attorney, Agent, or Firm*—Sughrue Mion, PLLC

(57) ABSTRACT

The present invention relates to an image processing apparatus and method using a memory, scan controller, transmission controller, file manager and fax controller. The software is configured for an image process in which a facsimile function is controlled to operate a request function to issue the volume utilization request in response to generation of a facsimile transmission request.

11 Claims, 10 Drawing Sheets

FIG. 3

| VOLUME UTILIZATION REQUEST | VOLUME DESIGNATION PARAMETERS | REQUEST AFTER CONVERSION |
|---|---|---|
| FILE OPENING | VOLUME A | REQUEST TO FILE SYSTEM CONTROL UNIT TO GENERATE FILE HANDLE FOR VOLUME A FILE |
| | VOLUME T | REQUEST TO FACSIMILE CONTROL UNIT TO PREPARE TRANSMISSION DATA OUTPUT OR RECEPTION DATA INPUT |
| DATA WRITING | VOLUME A | REQUEST TO FILE SYSTEM CONTROL UNIT TO OUTPUT DATA TO VOLUME A FILE |
| | VOLUME T | REQUEST TO FACSIMILE CONTROL UNIT TO OUTPUT TRANSMISSION DATA |
| DATA READING | VOLUME A | REQUEST TO OUTPUT TRANSMISSION DATA TO VOLUME A |
| | VOLUME T | RECEIVED DATA INPUT REQUEST TO FACSIMILE CONTROL UNIT |
| FILE CLOSING | VOLUME A | REQUEST TO FILE SYSTEM CONTROL UNIT TO DISCARD FILE HANDLE OF VOLUME A FILE |
| | VOLUME T | REQUEST TO FACSIMILE CONTROL UNIT TO TERMINATE TRANSMISSION DATA OUTPUT OR RECEIVED DATA INPUT |

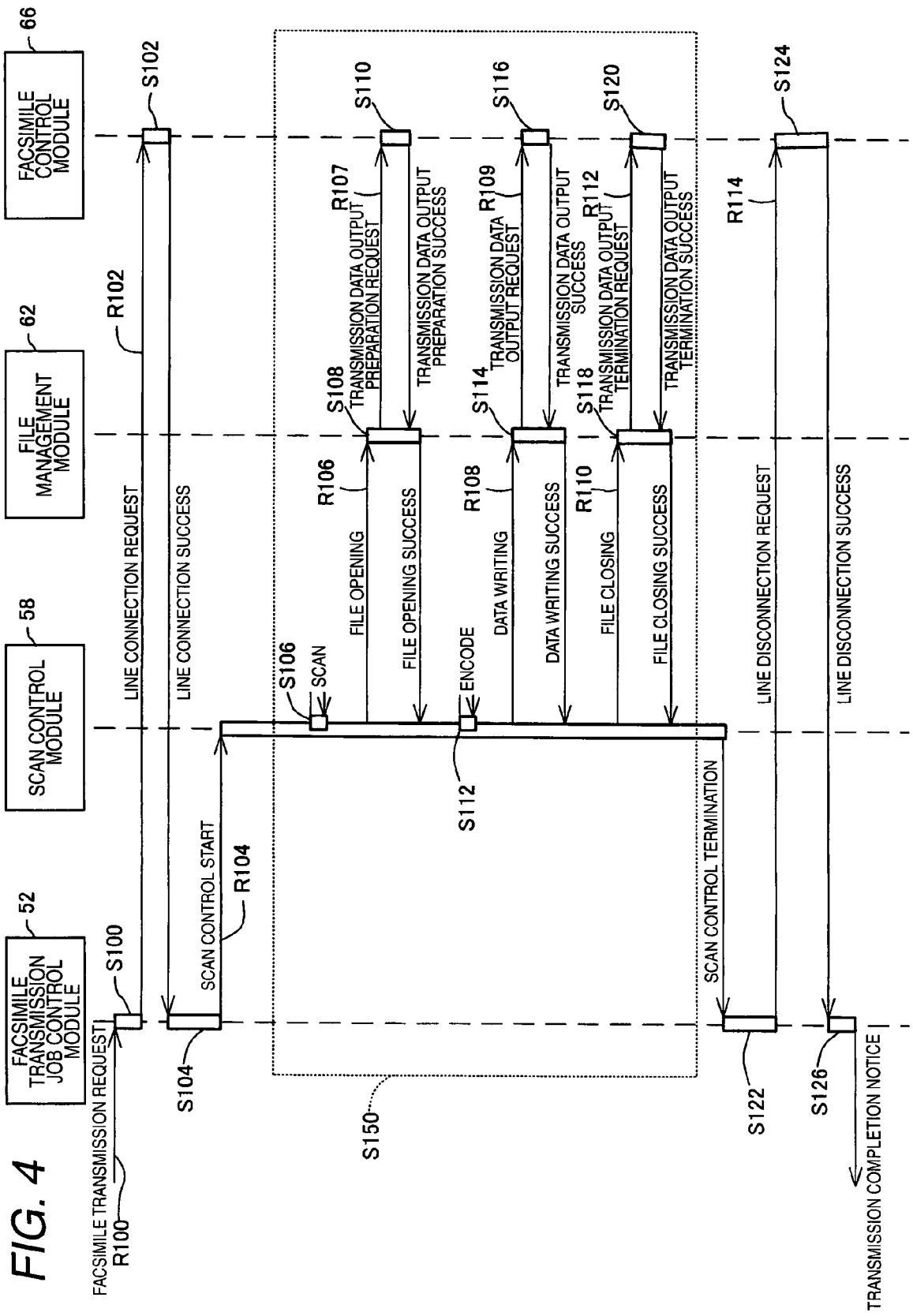

FIG. 7

| VOLUME UTILIZATION REQUEST | VOLUME DESIGNATION | DIRECTORY DESIGNATION | REQUEST AFTER CONVERSION |
|---|---|---|---|
| CURRENT DIRECTORY CHANGE | VOLUME A | DCIM | REQUEST TO FILE SYSTEM CONTROL UNIT TO CHANGE CURRENT DIRECTORY TO DCIM DIRECTORY OF VOLUME A |
| | VOLUME T | SEND | LINE DISCONNECTION REQUEST TO FACSIMILE CONTROL UNIT |
| | | RECV | RECEIVED DATA PROCESSING START REQUEST TO FACSIMILE CONTROL UNIT |
| | | REPORT | REPORT DATA PROCESSING START REQUEST TO FACSIMILE CONTROL UNIT |
| | | ROUTE DIRECTORY | LINE DISCONNECTION REQUEST OR RECEIVED DATA PROCESSING TERMINATION REQUEST OR REPORT DATA PROCESSING TERMINATION REQUEST TO FACSIMILE CONTROL UNIT |

IMAGE PROCESSING APPARATUS AND IMAGE PROCESSING METHOD

BACKGROUND

1. Technical Field

The present invention relates to an image processing apparatus and image processing method, and more particularly to the configuration of software for an image processing apparatus which includes a facsimile function.

2. Related Art

There is a related multifunction printer which includes a printing function, a scanning function, a facsimile function and the like (refer to JP-A-2002-84383). Software is installed on the multifunction printer for realizing the printing function, the scanning function, the facsimile function and the like. Although, in the event that the software is completely separated for each of these functions, it can be said that the pieces of software are highly independent of each other, the size of software is increased, and man hours for software development are also increased. It is desired to have a configuration in which the connection of the pieces of software is weak (the pieces of software are highly independent of each other) in order not only to decrease the size of software as much as possible by sharing portions thereof that can be shared among the functions but also to enhance the ease of maintenance of the software.

Let's think of a software configuration when adding a new facsimile function to a stand-alone multifunction printer including a printing function and a scanning function. Let's assume then that software for a process for reading an image stored in a memory card and causing a printing unit to print the image, a process for storing an image that a scanning unit is caused to read in a memory card and the like is configured by a module for issuing requests (for example, file opening, read, writ, file closure and the like) to read and write an image file from and on a memory card in response to an instruction from a high order (host) application and a driver module which control the access to the memory card when receiving the requests and has already been developed. Then, when adding a module for realizing a new facsimile function, it is a general consideration that a module for issuing requests of facsimile transmission, acquisition of received facsimile data, line connection, line disconnection and the like in response to instructions from the host application and a driver module for controlling a facsimile unit when receiving those requests are necessary. Incidentally, the process for saving an image that the scanning unit is caused to read for the memory card and a process for facsimile transmitting the image that the scanning unit is caused to read are common in are as where the image is inputted in an internal memory by controlling the scanning unit and the image is outputted to an output receiver from the internal memory. In addition, the process for reading an image stored in the memory card and causing the printing unit to print the image and a process for causing the printing unit to print received facsimile data are common in are as where an image is inputted in the internal memory from an input source and the printing unit is caused to print the inputted image. However, an interface that has already been developed for inputting and outputting an image in and from the internal memory is for reading and writing an image file from and on a memory card, that is for making use of a volume having a file system. Although the concept of inputting and outputting the image in and from the internal memory is common, the request to make use of the volume having the file system and the request to the facsimile unit which is not the volume having the file system are different.

SUMMARY

An advantage of some aspects of the invention is to provide an image processing apparatus and an image processing method which enable the reduction in size of a whole program and man hours for development thereof by sharing a procedure of software for other functions possesses with a procedure of software for a facsimile function.

According to an aspect of the invention, there is provided an image processing apparatus comprising:

an internal memory;

a scan controller, operable to cause a scan unit to read an image, to input the image into the internal memory and to issue a volume utilization request that includes a facsimile unit as a volume designation parameter;

a transmission controller, operable to cause the facsimile unit to transmit data based on the image input into the internal memory in response to a transmission data output request;

a file manager, operable to receive the volume utilization request and to convert the volume utilization request into the transmission data output request to the transmission controller; and a facsimile transmission job controller, operable to request the scan controller to issue the volume utilization request in response to generation of a facsimile transmission request.

The present disclosure relates to the subject matter contained in Japanese patent application No. 2006-024218 filed on Feb. 1, 2006, which is expressly incorporated herein by reference in its entirety.

BRIEF DESCRIPTION OF THE DRAWINGS

The invention will be described with reference to the accompanying drawings, wherein like numbers reference like elements.

FIG. 3 is a correspondence diagram according to a first embodiment of the invention.

FIG. 4 is a sequence diagram according to the first embodiment of the invention.

FIG. 7 is a correspondence diagram according to a second embodiment of the invention.

DESCRIPTION OF EXEMPLARY EMBODIMENTS

Figure 1:
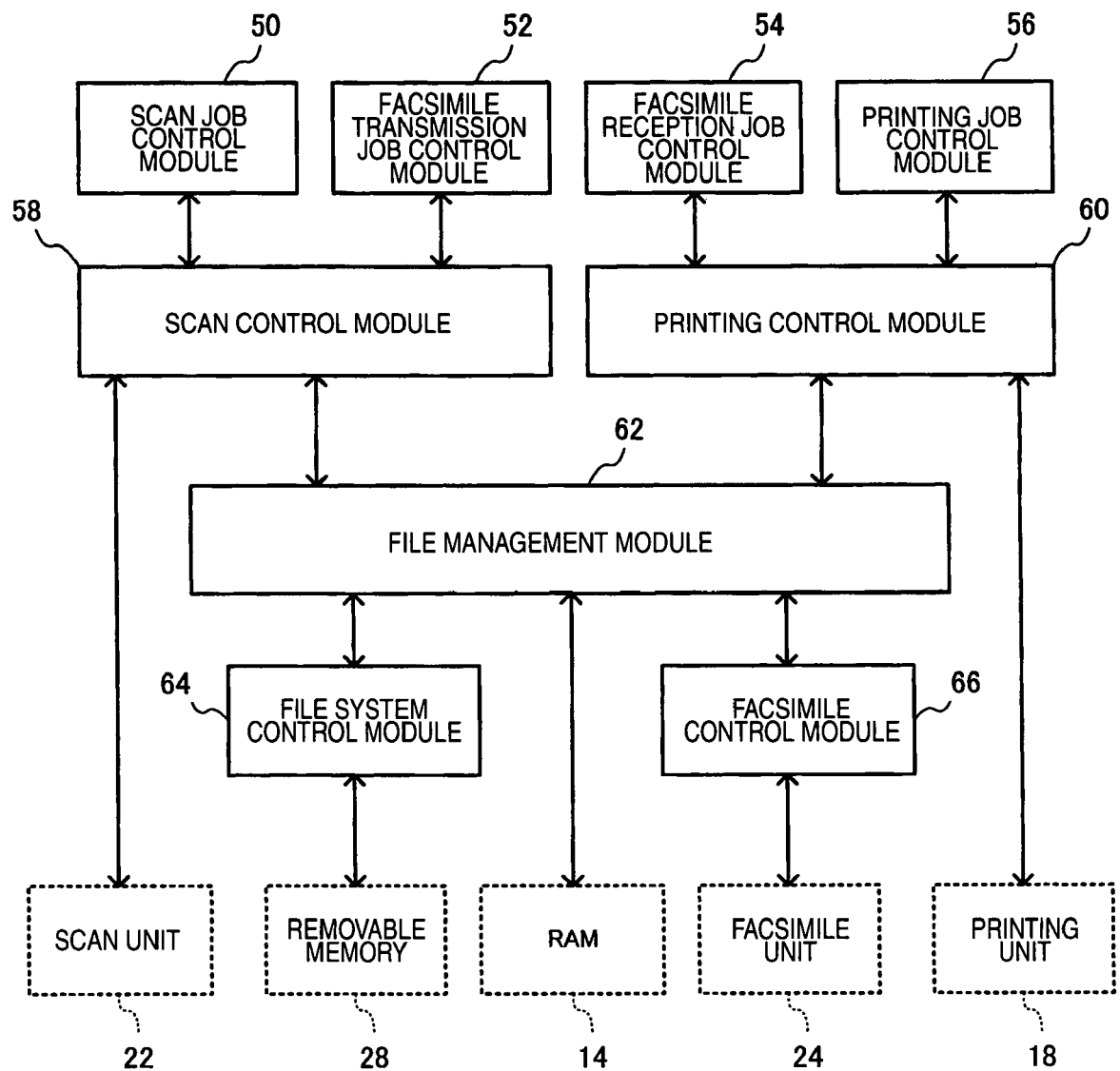
FIG. 1 is a block diagram showing a software configuration according to an embodiment of the invention.

Hereinafter, a mode for carrying out the invention will be described based on a plurality of embodiments in the following order. In the embodiments, constituent elements given like reference numerals correspond to each other.

1. First Embodiment
1-1. Hardware Configuration
1-2. Software Configuration
1-3. Transmitting Operation 1-4. Receiving Operation
1-5. Report Printing Operation
2. Second Embodiment
1-1. Transmitting Operation
1-2. Receiving Operation
1-3. Report Printing Operation

1. First Embodiment

1-1. Hardware Configuration

Figure 2:
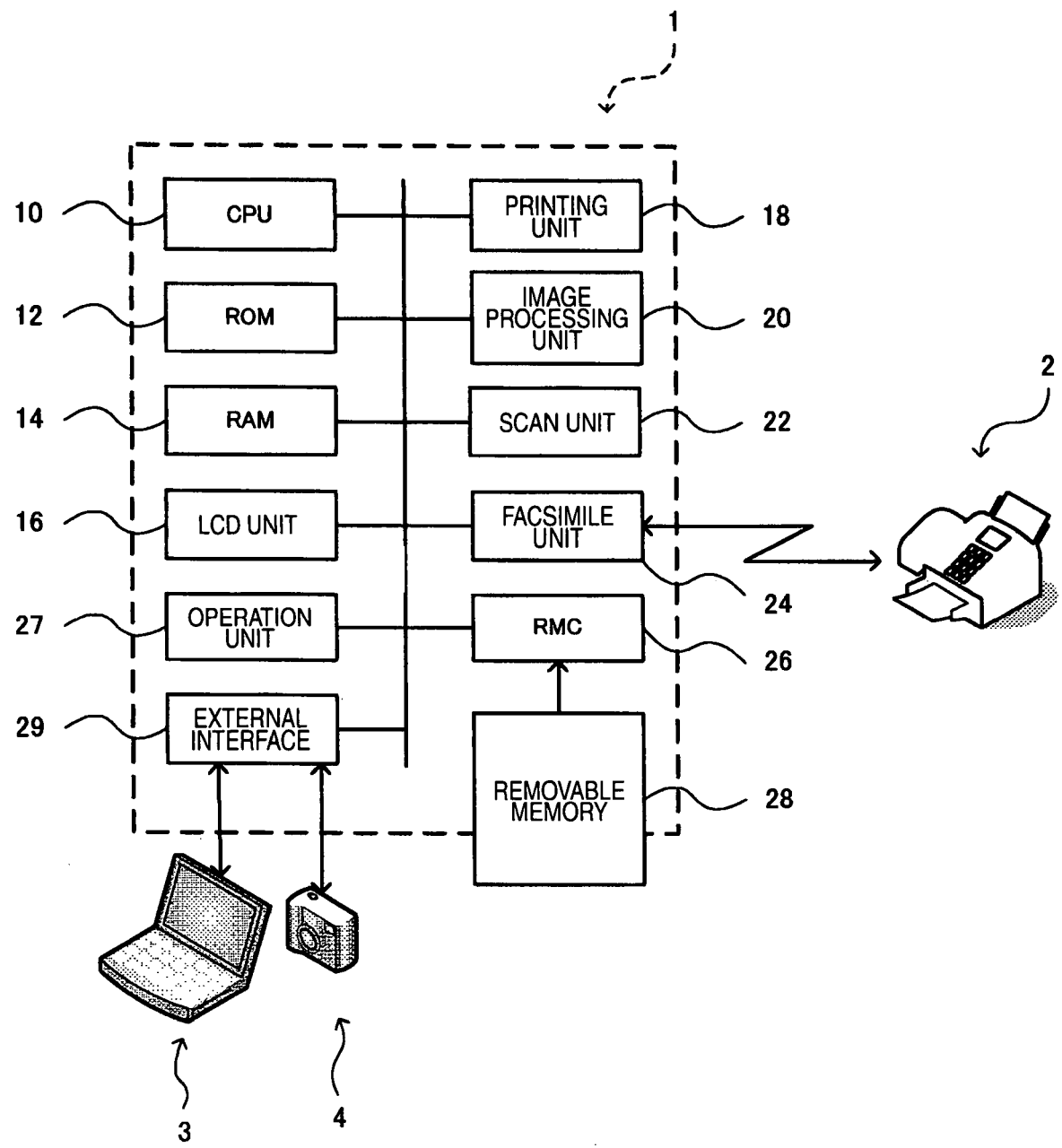
FIG. 2 is a block diagram showing a hardware configuration according to the embodiment of the invention.

FIG. 2 is a block diagram showing a multifunction printer (MFP) 1 to which an image processing apparatus according to the invention is applied. The MFP 1 has a printing function, a photocopying function, a scanning function and a facsimile function.

A CPU 10 controls units of the MFP 1 by executing programs stored in a ROM 12. Programs can be stored in the ROM 12 by downloading them from predetermined servers via a network or reading them from a recording medium such as a removable memory 28 which can be read by a computer. The ROM 12 is a nonvolatile storage medium such as a flash memory.

A RAM 14 is a volatile storage medium such as an SDRAM in which a control program, data to be processed by the CPU 10 and image data are stored temporarily.

An LCD unit 16 includes a liquid crystal panel, not shown, and a driving circuit therefor.

An operation unit 27 includes a plurality of keys used to input into the MFP 1 requests from a user such as a print request, a facsimile transmission request, a scan request and the like.

An external interface 29 is an input/output mechanism for controlling a communication between the MFP 1 and an external system such as a personal computer (PC) 3, a digital still camera (DSC) 4 and the like and includes USB connectors and USB controllers. A controller may be included which controls Bluetooth and IrDA communication. The user of the PC 3 and the DSC 4 can input an image data print request into the MFP 1 via the PC 3 and the DSC 4. When an image data print request is inputted from the PC 3 or the DSC 4, image data held by the PC 3 and the DSC 4 is inputted into the MFP 1 and the MFP 1 executes a printing of the inputted image data.

A removable memory controller (RMC) 26 is an input/output mechanism for reading image data or the like stored in the removable memory 28 connected to a connector, which is not shown, and writing image data or the like on the removable memory 28. A plurality of RMCs 26 may be provided for removable memories 28 of different types.

A facsimile unit 24 includes an NCU (network Control Unit) for connection with a public telephone line, a modem for modulating and demodulating transmitting and received data, a protocol control unit for performing a protocol control according to the ITU-T advice, a buffer memory for temporarily accumulating transmitting and received data and a storage medium for storing communication history data and communication control data such as an abbreviated dialing number and the like. The facsimile unit 24 transmits facsimile data to one other facsimile unit 2 and receives facsimile data from the one other facsimile unit 2 via public telephone lines. Monochrome facsimile data is binary image data which is based on a G3 facsimile and color facsimile data is image data of a JPEG format.

A scan unit 22 includes a linear image sensor, a driving circuit for the linear image sensor, an illumination unit, an imaging optical system and an AD converter. In the scan unit 22, an image of a document illuminated by the illumination unit is formed on a light receiving surface of the linear image sensor by the imaging optical system which include a lens, a mirror and the like, and an output signal of the linear image sensor is converted into a digital signal by the AD converter, so that the digital signal is written on the RAM 14. Scan unit 22 may be of a flat bed type, a sheet feed type or a handy type. The linear image sensor may be of a contact type or a lens-reducing type. The illumination unit may use a fluorescent lamp or an LED as a light source.

An image processing unit 20 is a DSP for executing at high speeds gamma correction for generating printing data from image data, resolution change, segmentation process, half toning, interlacing process and the like.

A printing unit 18 includes a printing head, not show, which forms an image on a printing medium such as paper using an ink jet method, a head carriage driver, a sheet feeder, a printing unit controller for controlling these printing unit constituent components and the like. The printing unit 18 may be configured so as to conform to other printing methods such as a laser method. The printing head is provided on a head carriage, not shown, on which an ink cartridge is installed and includes a nozzle, a piezo device, and a piezo drive circuit for outputting a control signal for application to the piezo device. The piezo drive circuit applies a drive signal of a predetermined waveform to the piezo device in response to a control signal outputted from the printing unit controller. The head carriage driver includes a motor, a drive belt, a motor drive circuit and the like, which are not shown, and causes the printing head to reciprocate perpendicular to a sheet transport direction. The sheet feeder includes sheet transport rollers, a motor, a motor drive circuit and the like, which are not shown, and transports a sheet in a direction perpendicular to an axis of a traveling direction of the printing head by rotating the sheet transport rollers. The printing unit controller is an ASIC which includes a buffer memory to which printing data is transferred sequentially from the RAM 14, a function to control a timing at which printing data stored in the buffer memory is outputted to the printing head according to the position of the head carriage, a function to control the head carriage driver and a function to control the sheet feeder.

The description of the hardware configuration ends here.

1-2. Software Configuration

In software for controlling the MFP 1, a removable memory 28 connected to a connector of the RMC 26 which is made equivalent to an identifier "A" is treated as a volume A. In addition, the facsimile unit 24 made equivalent to an identifier "T" is treated as a volume T.

FIG. 1 is a block diagram showing the configuration of an image processing program of the MFP 1 to which the image processing apparatus of the invention is applied.

A scan job control module 50 is a program component which requests a scan control module 58 to issue a volume utilization request which includes the removable memory 28 as a volume designation parameter when a scan request is produced by the user who operates a predetermined key on the operation unit 27. To be specific, the scan job control module 50 issues to the scan control module 58 a request to cause the scan control module 58 to cause, in turn, the scan unit 22 to read image data to store it in the RAM 14 and to output the image data stored in the RAM 14 to the removable memory 28. The volume utilization request will be described later on.

A facsimile transmission job control module 52, which is a program component, requests the scan control module 58 to issue a volume utilization request which includes the facsimile unit 24 as a volume designation parameter when a facsimile transmission request is produced by the user who operates a predetermined key on the operation unit 27. To be specific, the facsimile transmission job control module 52 issues to the scan control module 58 a request to cause the scan control module 58 to cause, in turn, the scan unit 22 to read image data to store it in the RAM 14 and to transmit the image data stored in the RAM 14 to the facsimile unit 24. The volume utilization request will be described later on.

When receiving a request from the scan job control module 50, the scan control module 58, which is a program component, controls the scan unit 22 to read image data and store it in the RAM 14 and issues a volume utilization request which includes the removable memory 28 as the volume designation parameter. In addition, when receiving a request from the facsimile transmission job control module 52, the scan control module 58 controls the scan unit 22 to read image data and store it in the RAM 14 and issues a volume utilization request which includes the facsimile unit 24 as the volume designation parameter. Issuing the volume utilization request is calling file operation system APIs (Application Program Interfaces) for file opening, data writing, data reading, file closure, one character reading, one character writing, file retrieval, file size acquisition, and file information acquisition, and directory operation system APIs for current drive change, directory creation, current directory change, and directory deletion. For example, in a case where a file which is an object to be opened is designated by a format of "A:¥¥IMAGE.JPG" as a parameter of the file opening API, the volume designation parameter corresponds to the parameter formatted as "A:¥¥IMAGE.JPG." A portion indicated by "A" refers to a volume identifier. The file operation system APIs other than the file opening API, which are the data writing, data reading and file closure APIs, use a file handle produced by calling the file opening API as a parameter. In this case, since a file to be operated, a directory to which the file belongs and a volume are related to each other by this file handle, the file handle corresponds to the volume designation parameter.

A file management module 62, which is a program component, receives a volume utilization request and converts the volume utilization request in accordance with the volume designation parameter. FIG. 3 is a diagram showing a correspondence between volume utilization requests and requests after conversion. Volume utilization requests having the volume T as their volume designation parameters are converted into process requests to a facsimile control module 66. For example, a data writing request as the volume utilization request is converted into a transmission data output request, and a data reading request as the volume utilization request is converted into a received data input request. Volume utilization requests having a volume A as their volume designation parameters are converted into process requests to a file system control module 64, which will be described later on. For example, a data writing request as the volume utilization request is converted into a data output request to the removal memory 28, and a data reading request as the volume utilization request is converted into a data input request from the removal memory 28.

In addition, in the file management module 62, a file management table for management of directories and files of the volume T are held in the RAM 14. An entry of three directories of SEND, RECV and REPORT is made in route directories of the volume T.

The file system control module 64 is a program component which controls input into and output from the removable memory 28. The file system control module 64 transfers data from the RAM 14 to the removable memory 28 in response to a data output request from the file management module 62. In addition, the file system control module 64 writes data transferred from the removable memory 28 on the RAM 14 in response to a data input request from the file management module 62.

The facsimile control module 66, which is a program component, controls the facsimile unit 24 to transmit data transferred from the RAM 14 in response to a transmission data output request from the file management module 62. In addition, the facsimile control module 66 writes data received by the facsimile unit 24 on the RAM 14 in response to a received data input request from the file management module 62.

A facsimile reception job control module 54, which is a program component, requests to issue a volume utilization request which includes the facsimile unit 24 as the volume designation parameter in response to an incoming call for the facsimile unit 24. To be specific, the facsimile reception job control module 54 issues to a printing control module 60 a request to cause the printing control module 60 to input reception data received by the facsimile unit 24 in the RAM 14 and cause the printing unit 18 to print inputted image data.

A printing job control module 56 requests the printing control module 60 to issue a volume utilization request which includes the removable memory 28 as the volume designation parameter when a printing request is produced by the user who operates a predetermined key on the operation unit 27. To be specific, the printing job control module 56 issues to the printing control module 60 a request to input image data stored in the removable memory 28 in the RAM 14 and cause the printing unit 18 to print the inputted image data.

The printing control module 60, which is a program component, issues a volume utilization request which includes the facsimile unit 24 as the volume designation parameter and causes the printing unit 18 to print image data inputted in the RAM 14 when receiving a request from the facsimile reception job control module 54. In addition, when receiving a request from the printing job control module 56, the printing control module 54 issues a volume utilization request which includes the removable memory 28 as the volume designation parameter and causes the printing unit 18 to print the image data inputted in the RAM 14.

The description of the software configuration ends here.

Hereinafter, a procedure and flow of issuing requests between the modules will be described specifically. The issuance of requests between the modules and processes involved proceed through execution of an image processing program by the CPU 10.

1-3. Transmitting Process Sequence

FIG. 4 is a sequence diagram illustrating a procedure and flow of issuing requests between the modules when a facsimile transmission is performed.

In step S100, a line connection request R102 is issued from the facsimile transmission job control module 52 in response to generation of a facsimile transmission request R100. To be specific, in this embodiment, information on communication type, communication method, communication mode, existence of a transaction report, dialing number and the like is set as a parameter of a facsimile unit open function, and the facsimile unit open function is called. The description continues on the assumption that "transmission" is set as the communication type and "direct transmission" is set as the communication method in the sequence diagram shown in FIG. 4. The direct transmission is a transmission method in which reading a document is started in a stage where a connection with a facsimile machine of the other party is established and an image which is read is then transmitted to the other party's facsimile machine.

In step S102, the facsimile unit 24 is controlled by the facsimile control module 66, and a line is connected with the other party's facsimile machine. When line connection success is noticed from the facsimile unit 24, the fact that the line is connected successfully is noticed to the facsimile transmission job control module 52 by the facsimile control module 66.

In step S104, the facsimile transmission job control module 52 issues a scan control start request R104 to cause the scan unit 22 to read image data so as to store it in the RAM 14 and to transmit the image data stored in the RAM 14 to the facsimile unit 24.

In step S106, the scan unit 22 is controlled by the scan control module 58 to read image data, and the image data is then stored in the RAM 14.

Next, a file opening request R106 is issued. To describe specifically, "T:¥¥SEND¥¥AGE001.JPG" is set as a parameter, and a file opening API is called.

In step S108, the parameter of the file opening API is analyzed by the file management module 62. If it is determined that the volume T is designated, a transmission data output preparation request R107 is issued to the facsimile control module 66.

In step S110, setting for transmission data output to the facsimile unit 24 is made by the facsimile control module 66. In addition, a file is newly created in a predetermined directory within the volume T. To describe it specifically, a file entry is created in the entry management table held in the RAM 14 for management of directories and files of the volume T. This is because, although the facsimile unit 24 is not a storage medium having a file system, the facsimile unit 24 is handled as if it were a recording medium having a file system so that transmission of image data can be handled as data writing on the file. In this embodiment, the description continues on the assumption that an entry of APGE001.JPG ("T:¥¥SEND¥¥PAGE001.JPG") is made in the SEND directory of the T drive. When transmission data output preparation success is noticed, the file handle is delivered to the scan control module 58 as a notice of file opening success. In addition, in the event that the other party's facsimile machine is not adapted to accept a color image, in place of "transmission data output preparation success," "transmission data output preparation failure" is noticed to the file management module 62, and based on such a notice, "file opening failure" is noticed to the scan control module 58, whereby a predetermined transmission failure sequence is executed.

In step S112, the image data stored in the RAM 14 is encoded into a JPEG format by the scan control module 58. When encoding is completed, a data writing request R108 is issued. To describe this specifically, the data writing API is called.

In step S114, a transmission data output request R109 is issued from the file management module 62.

In step S116, the encoded image data that is stored in the RAM 14 is transferred to a facsimile transmission buffer memory by the facsimile control module 66. In the case of the direct transmission, since the line is connected at this point in time, the data transferred to the buffer memory is transmitted sequentially to the other party's facsimile machine.

When data writing success is noticed to the scan control module 58, a file closing request R110 is issued. To described this specifically, the file closing API is called.

In step S118, a transmission data output termination request R112 is issued from the file management module 62.

In step S120, setting for transmission data output termination to the facsimile unit 24 is made by the facsimile control module 66. In addition, the file entry created in the entry management table in step S110 is deleted.

In step S122, when a scan control termination is noticed, a line disconnection request R114 is issued by the facsimile transmission job control module 52. To be specific, in this embodiment, a facsimile unit closing function is called.

In step S124, the facsimile unit 24 is controlled by the facsimile control module 66, and the line with the other party's facsimile machine is disconnected.

In step S126, when line disconnection success is noticed, transmission completion is noticed to the host (high order) module by the facsimile transmission job control module 52. When receiving the notice, the host module controls the LCD unit 16, whereby a sequence to inform the user of the transmission completion or the like is executed. Note that the host module is a module which executes the issuance of requests to the scan job control module and the facsimile transmission job control module, facsimile reception job control module, the printing job control module and the like in response to key operation by the user or occurrence of other events and the control of GUI in response to key operation or occurrence of an event and the like.

In the above description, while the case is described in which the number of pages to be transmitted is one page, in the event that a plurality of pages are transmitted, the sequence S150 will be repeated the number of times which equals the number of pages in response to input by the user of setting of a message saying that there is a page or pages to follow.

A portion that can be shared with the sequence that is executed by the scan job control module 50 is the scan control module 58 in which the scan unit is caused to read image data, the image data is inputted in the RAM 14, the inputted image data is encoded in the predetermined format, and the volume utilization request to the volume designated by the volume designation parameter is issued. The portion that can be shared with the existing module is so shared so as to suppress the increase in the program size, thereby making it possible to reduce the development man hours. In addition, since the processes related to the facsimile function are concentrated on the facsimile transmission job control module 52 and the facsimile control module 66, the ease of maintenance is enhanced as exemplified by easy addition and deletion of facsimile functions.

Note that while in the above description, the case of direct transmission has been described, a memory transmission can also be realized by utilizing the sequence S150. The memory transmission is a communication method in which a document is started to be read before the line is connected to the other party's facsimile machine, after an image resulting from the reading is temporarily stored in the RAM 14, the line connection with the other party's facsimile machine is established, and the image stored in the RAM 14 is then transmitted to the other party's facsimile machine. In the case of the parameter of the facsimile unit opening function which designates the communication method being the "memory transmission," in step S102, no setting for line connection is performed by the facsimile control module 66. When the facsimile unit closing function is called in step S122, in step S124, the facsimile unit 24 is controlled by the facsimile control module 66, and line connection, transmission of data accumulated in the buffer memory and line disconnection are executed sequentially.

1-4. Receiving Process Sequence

Figure 5:
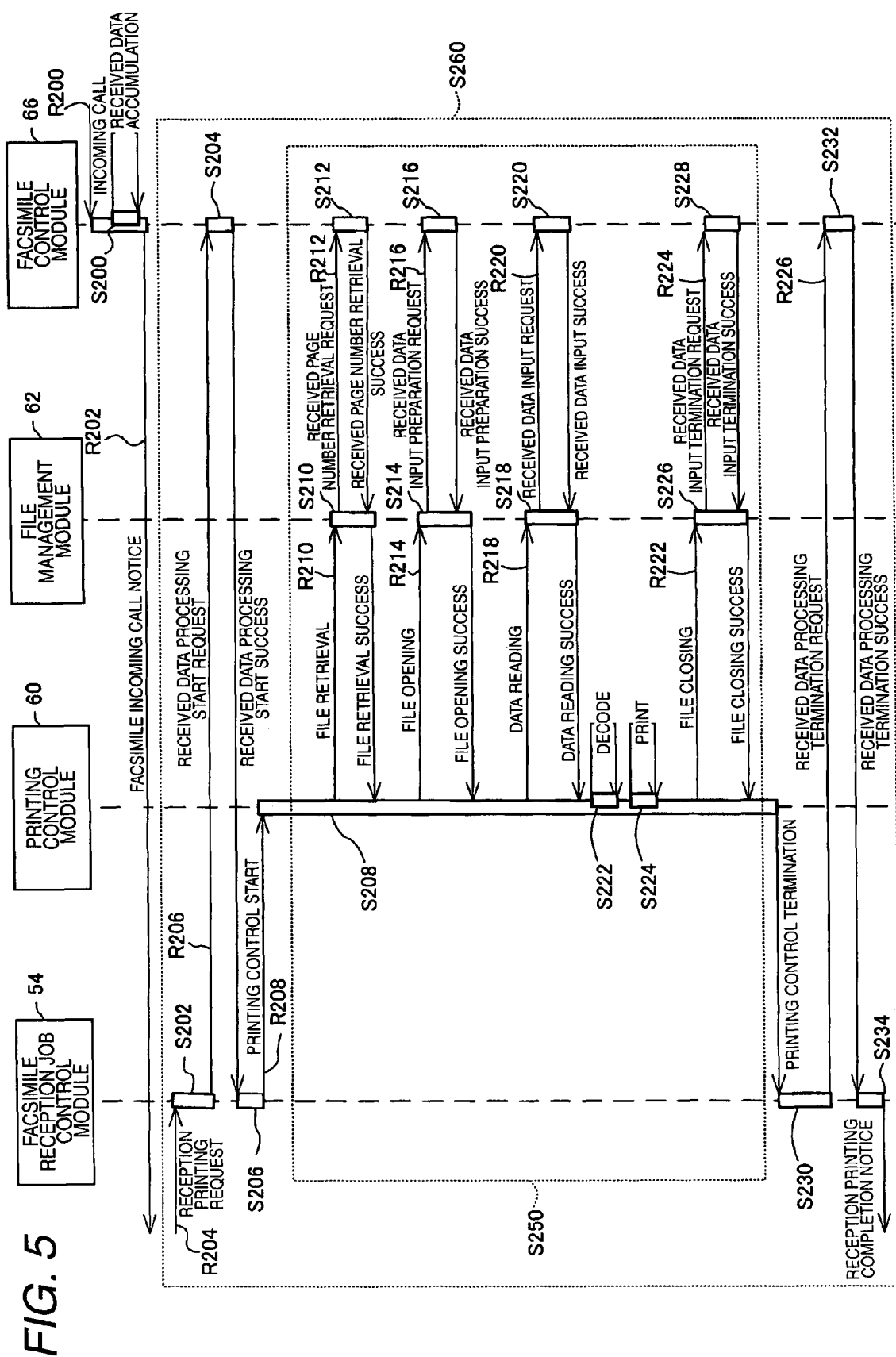
FIG. 5 is a sequence diagram according to the first embodiment.

FIG. 5 is a sequence diagram illustrating a procedure and flow of issuing requests between the modules when a facsimile reception is performed.

In step S200, when an incoming call R200 occurs, received data is accumulated in the buffer memory of the facsimile unit 24. In addition, a facsimile incoming call notice R202 is noticed to the host module by the facsimile control module 66. When the facsimile incoming call notice R202 is noticed to the host module, a reception printing request R204 is issued.

In step S202, a received data processing start request R206 is issued by the facsimile reception job control module 54. To describe this specifically, in this embodiment, the facsimile unit opening function is set to "reception" as the communication type parameter and is called.

In step S204, setting for reading the received data accumulated in the buffer memory to the RAM 14 is made at the facsimile unit 24.

In step S206, a printing control start request R208 is issued by the facsimile reception job control module 54. The printing control start request R208 is a request to read image data stored in the volume designated by the parameter to the RAM 14 and cause the printing unit 18 to print it.

In step S208, a file retrieval request R210 is issued by the printing control module 60. To describe this specifically, the directory RECV of the volume T is set as a parameter, and the file retrieval API is called.

In step S210, a received page number retrieval request R210 is issued by the file management module 62.

In step S212, the number of pages of received data accumulated in the buffer memory of the facsimile unit 24 is obtained. In the event that there exists one page of received color data, an entry of PAGE001.JPG is made in the entry management table of the volume T as a file of the directory RECV. In the event that there exists received monochrome data, an entry of a file of PAGE001.BMP is made. This is because, although the facsimile unit 24 is not a storage medium having a file system, the facsimile unit 24 is handled as if it were a recording medium having a file system so that received data can be handled as reading data from the file. In this embodiment, the description continues on the assumption that an entry of PAGE001.JPG ("T:¥RECV¥PAGE001.JPG") is made in the RECV directory of the volume T. When received page number retrieval success is noticed, file retrieval success is noticed together with information on file name, extension and full pathname of a file found to the printing control module 60 by the file management module 62.

When the file retrieval success is noticed, a file opening request R214 is issued by the printing control module 60. To describe this specifically, the "T:¥¥RECV¥¥PAGE001.JPG" that is retrieved in step S212 is set as a parameter, and the file opening API is called.

In step S214, the parameter of the file opening AP1 is analyzed by the file management module 62. If it is determined that the volume T is designated, a received data input preparation request R216 is issued by the file management module 62.

In step S216, setting for forwarding one page of received data corresponding to PAGE001.JPG which is accumulated in the buffer memory of the facsimile unit 24 to the RAM 14 is made by the facsimile control module 66.

Next, the printing control module 60 issues a data reading request R218. To be specific, a file handle as a file opening success notice is designated as a parameter, and the data reading API is called.

In step S218, a received data input request R220 is issued by the file management module 62.

In step S220, received data on a page corresponding to the file that is opened in step S214 which is accumulated in the buffer memory of the facsimile unit 24 is transferred to the RAM 14 by the facsimile control module 66.

In step S222, the received data transferred to the RAM 14 is decoded into a RGB format.

In step S224, printing is executed by the printing unit 18 on the basis of the image data decoded in step S222.

Following this, a file closing request R222 is issued by the printing control module 60. To describe this specifically, the file closing API is called in which the file handle as the file opening success notice is designated as the parameter.

In step S226, a received data input termination request is issued by the file management module 62.

In step S228, received data input termination is set to the facsimile unit 24 by the facsimile control module 66. In addition, the file entry created in the entry management table in step S212 is deleted. The data having transferred to the RAM 14 which is accumulated in the buffer memory of the facsimile unit 24 is also discarded from the buffer memory.

In step S230, when printing control termination is noticed, a received data processing termination request R226 is issued by the facsimile reception job control module 54. To be specific, in this embodiment, the facsimile unit closing function is called.

In step S232, setting for terminating the transfer of received data accumulated in the buffer memory to the RAM 14 is made at the facsimile unit 24 by the facsimile control module 66.

In step S234, when received data processing termination success is noticed, received data printing completion is noticed to the hose module by the facsimile reception job control module 54.

In the above description, while the case is described in which the number of pages received is one page, in the event that a plurality of pages are received, the sequence S250 will be repeated the number of times which equals the number of pages received.

A portion that can be shared with the sequence that is executed by the printing job control module 56 is the printing control module 60 in which the volume utilization request to the volume designated by the volume designation parameter is issued, the image data read to the RAM 14 is decoded, and the printing unit 18 is caused to print it. The portion that can be shared with the existing module is so shared so as to suppress the increase in the program size, thereby making it possible to reduce the development man hours. In addition, since the processes related to the facsimile function are concentrated on the facsimile reception job control module 54 and the facsimile control module 66, the ease of maintenance is enhanced as exemplified by easy addition and deletion of facsimile functions.

1-5. Report Printing Process Sequence

Report printing is a function in which communication history data and communication control data such as an abbreviated dial and the like are printed. Since the report printing process sequence is a sequence in which data held by the facsimile unit 24 is read to the RAM 14 and is then printed, the report printing process sequence is similar to the receiving process sequence that has already been described (the sequence S260 in FIG. 5) except that the parameters are different. The report printing process sequence is executed when the host module issues a report printing request R304 in place of the reception printing request R204 (refer to FIG. 5).

Figure 6:
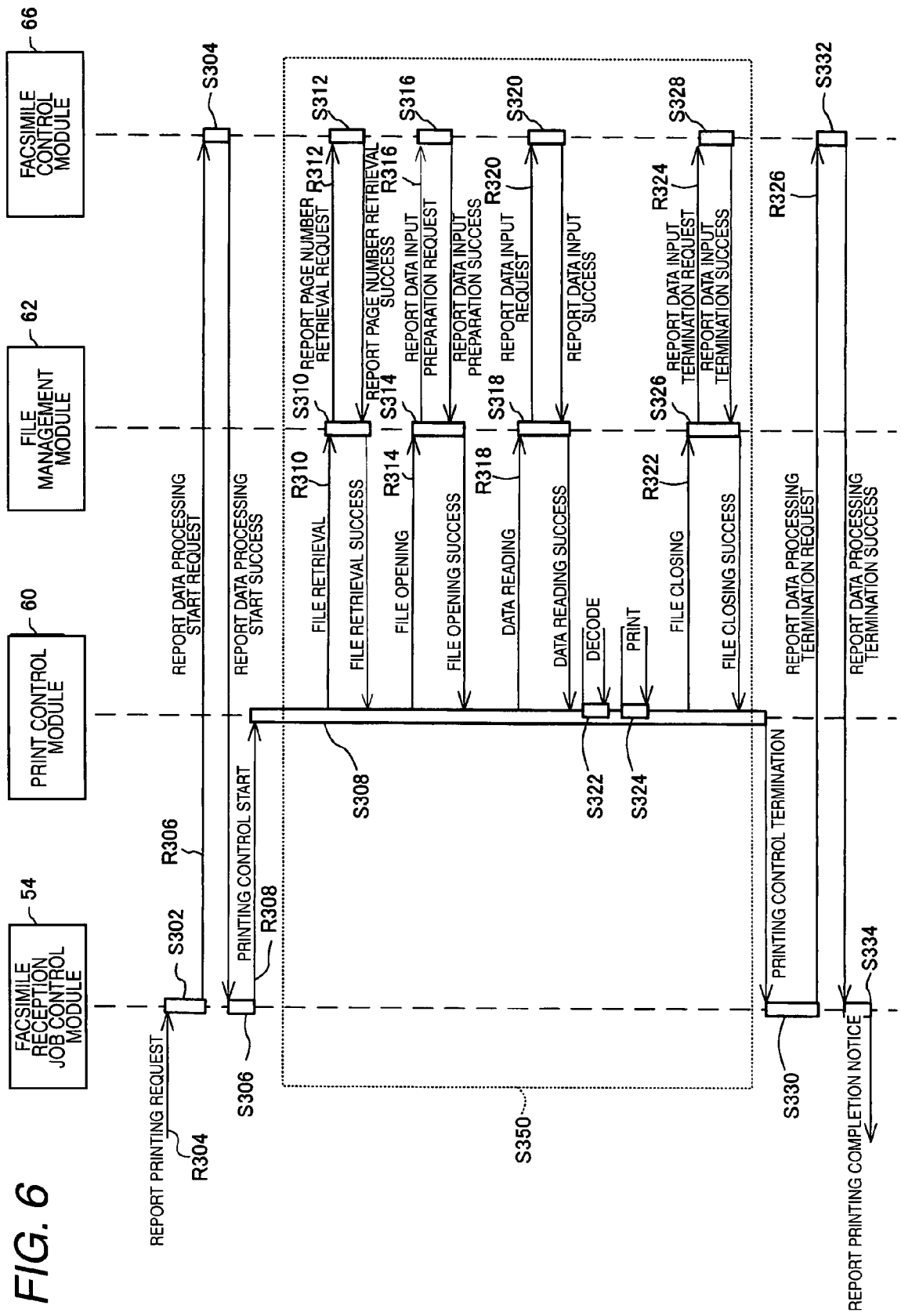
FIG. 6 is a sequence diagram according to the first embodiment.

FIG. 6 is a sequence diagram illustrating a procedure and flow of issuing requests between the modules when report is printed.

The report printing request R304 is produced when transmission is terminated or by the user who operates the operation unit 27.

In step S302, a report data processing start request R306 is issued by the facsimile reception job control module 54. To describe this specifically, in this embodiment, "report printing" is set as a parameter of the communication type, and the facsimile unit opening function is called.

In step S304, setting for reading report data held by the facsimile unit 24 to the RAM 14 is made at the facsimile unit 24 by the facsimile control module 66.

In step S306, a printing control start request R308 is issued by the facsimile reception job control module 54. The printing control start request R308 is a request to read image data stored in the volume designated by the parameter to the RAM 14 and cause the printing unit 18 to print the image data.

In step S308, a file retrieval request R310 is issued by the printing control module 60. To describe this specifically, the directory REPORT of the volume T is set as a parameter, and the file retrieval API is called.

In step S310, a report page number retrieval request R312 is issued by the file management module 62.

In step S312, the number of pages of the report data held by the facsimile unit 24 is obtained by the facsimile control module 66. In the event that there exists one page of report data, an entry of PAGE001.RPT is made in the entry management table of the volume T as a file of the directory REPORT. This is because, although the facsimile unit 24 is not a storage medium having a file system, the facsimile unit 24 is handled as if it were a recording medium having a file system so that report data can be handled as data reading from the file. In this embodiment, the description continues on the assumption that an entry of PAGE001.RPT ("T:¥¥REPORT¥¥PAGE001.RPT") is made in the REPORT directory of the volume T. When report page number retrieval success is noticed, file retrieval success is noticed together with information on file name, extension and full pathname of a file found to the printing control module 60 by the file management module 62.

When the file retrieval success is noticed, a file opening request R314 is issued by the printing control module 60. To describe this specifically, the "T:¥¥REPORT¥¥PAGE001.RPT" that is retrieved in step S312 is set as a parameter, and the file opening API is called.

In step S314, the parameter of the file opening AP1 is analyzed by the file management module 62. If it is determined that the volume T is designated, a report data input preparation request R316 is issued.

In step S316, setting for transferring one page of report data corresponding to PAGE001.RPT which is held by the facsimile unit 24 to the RAM 14 is made by the facsimile control module 66.

Next, the printing control module 60 issues a data reading request R318. To be specific, the data reading API is called in which a file handle as a file opening success notice is set as a parameter.

In step S318, a report data input request R320 is issued by the file management module 62.

In step S320, report data on a page corresponding to the file that is opened in step S314 which is held by the facsimile unit 24 is transferred to the RAM 14.

In step S322, the report data transferred to the RAM 14 is decoded into a RGB format.

In step S324, printing is executed by the printing unit 18 on the basis of the image data decoded in step S322.

Following this, a file closing request R322 is issued by the printing control module 60. To describe this specifically, the file closing API is called in which the file handle as the file opening success notice is set as the parameter.

In step S326, a report data input termination request R324 is issued by the file management module 62.

In step S328, report data input termination is set to the facsimile unit 24 by the facsimile control module 66. In addition, the file entry created in the entry management table in step S312 is deleted. The data having transferred to the RAM 14 which is held by the facsimile unit 24 is also discarded.

In step S330, when printing control termination is noticed, a report data processing termination request R326 is issued by the facsimile reception job control module 54.

In step S332, setting for terminating the forwarding of report data to the RAM 14 is made at the facsimile unit 24 by the facsimile control module 66.

In step S334, when report data processing termination success is noticed, report data printing completion is noticed to the hose module by the facsimile reception job control module 54.

2. Second Embodiment

FIG. 7 is a diagram showing a correspondence between volume utilization requests and requests after conversion. In the second embodiment, in addition to the volume utilization requests shown in FIG. 3, the volume utilization requests shown in FIG. 7 are converted by a file management module 62. In the second embodiment, a current directory change request is converted in accordance with volume designation parameters and directory designation parameters of the current directory change request. Volume utilization requests of the directory operation system other than the current directory change may be made equivalent to requests after conversion shown in FIG. 7.

2-1. Transmitting Process Sequence

Figure 8:
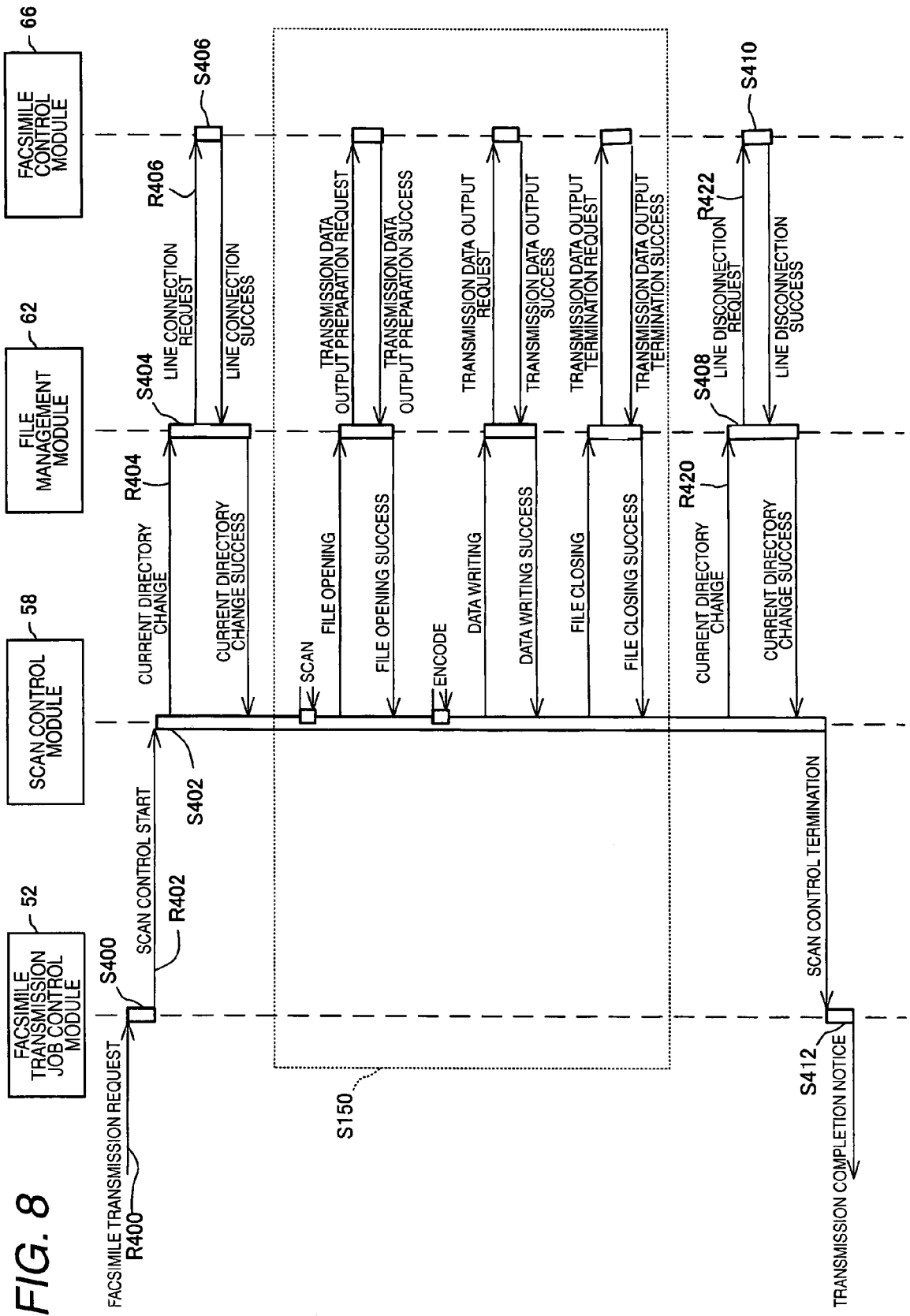
FIG. 8 is a sequence diagram according to the second embodiment of the invention.

FIG. 8 is a sequence diagram illustrating a procedure and flow of issuing requests between modules at the time of transmission according to the second embodiment. A sequence shown in FIG. 8 is a sequence for direct transmission.

In step S400, a scan control start request R402 is issued by a facsimile transmission job control module 52 in response to generation of a facsimile transmission request R400. The scan control start request R402 is a request to execute a sequence in which a scan unit 22 is caused to read image data to store the image data in a RAM 14 and to transmit the image data stored in the RAM 14 to a facsimile unit 24.

In step S402, a current directory change request R404 is issued by a scan control module 58. To be specific, a current directory change API is called in which "T:¥¥SEND" is set as a parameter.

In step S404, a line connection request R406 is issued from the file management module 62. To be specific, in this embodiment, information on communication type, communication method, communication mode, existence of a transaction report, dialing number and the like is set as a parameter of a facsimile unit open function, and the facsimile unit open function is called.

In step S406, the facsimile unit 24 is controlled by a facsimile control module 66, and a line is connected with the other party's facsimile machine. When line connection success is noticed from the facsimile unit 24, the fact that the line is connected successfully is noticed to the file management module 62 by the facsimile control module 66, and current directory change success is noticed to the scan control module 58 by the file management module 62.

When the current directory change success is noticed, the sequence S150 shown in FIG. 4 is executed.

When the sequence S150 is terminated, a current directory change request R420 is issued by the scan control module 58. To be specific, a current directory change API is called in which "T:" is set as a parameter.

In step S408, a line disconnection request R422 is issued by the file management module 62. To be specific, in this embodiment, a facsimile unit closing function is called.

In step S410, the facsimile unit 24 is controlled by the facsimile control module 66, and the line with the other party's facsimile machine is disconnected. When a line disconnection success notice is noticed from the facsimile unit 24, the fact that the line is disconnected successfully is noticed to the file management module 62 by the facsimile control module 66, and in response to the notice, the current directory change success is noticed to the scan control module 58 by the file management module 62.

In step S412, when scan control termination is noticed, transmission completion is noticed to a host module by the facsimile transmission job control module 52.

As has been described heretofore, since the current directory change request in which the volume T is set as the volume designation parameter is converted into the line connection request and the line disconnection request, as in the case where a current directory change request is issued when data read by a scan unit is forwarded to a predetermined directory of an external recoding medium, the facsimile unit 24 can be caused to execute the line connection and the line disconnection by issuing the current directory change request. The portion that can be shared with the existing module is so shared so as to suppress the increase in the program size, thereby making it possible to reduce the development man hours. In addition, since the processes related to the facsimile function are concentrated on the facsimile transmission job control module 52 and the facsimile control module 66, the ease of maintenance is enhanced as exemplified by easy addition and deletion of facsimile functions.

In the description that has been made heretofore, while the case is described in which the number of pages to be transmitted is one page, in the event that a plurality of pages are transmitted, the sequence S150 will be repeated the number of times which equals the number of pages in response to input by the user of setting of a message saying that there is a page or pages to follow. In addition, in the case of a memory transmission, the fact that the memory transmission is performed may be noticed to the facsimile control module 66 by changing the directory that is designated by the current directory change request R404 from the case of the direct transmission. In the case of the memory transmission, the line is not connected in S406, and the line connection, data transmission and the line disconnection are executed in step S410.

2-2. Receiving Process Sequence

Figure 9:
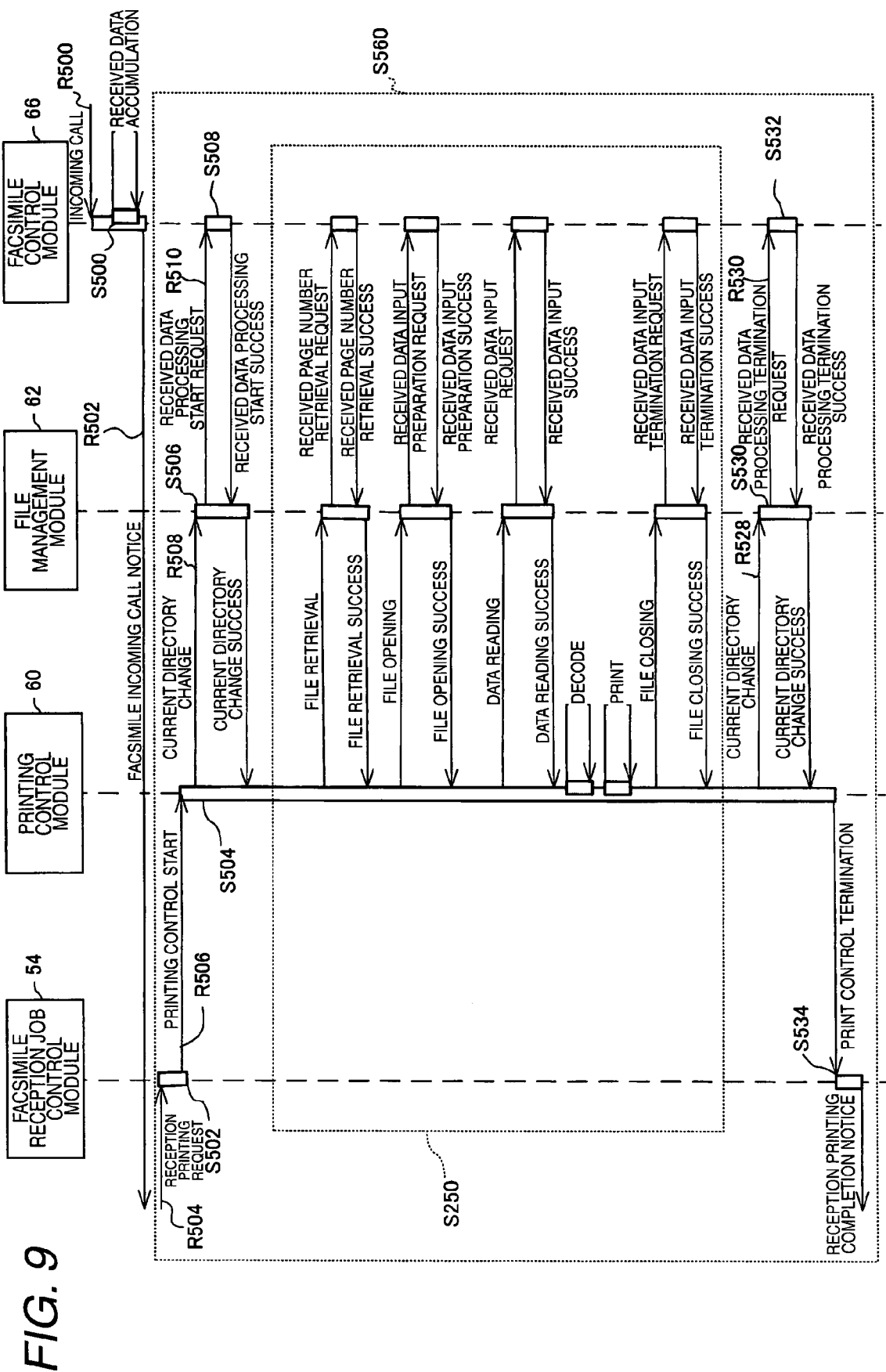
FIG. 9 is a sequence diagram according to the second embodiment.

FIG. 9 is a sequence diagram showing a procedure and flow of issuing requests between the modules at the time of reception according to the second embodiment.

In step S500, when an incoming call R500 is generated, received data is accumulated in a buffer memory of the facsimile unit 24. In addition, when a facsimile incoming call R502 is noticed to the host module by the facsimile control module 66, a reception printing request R504 is issued.

In step S502, a printing control start request R506 is issued by a facsimile reception job control module 54. The printing control start request R506 is a request to read image data stored in a predetermined directory of the volume that is designated by the parameter to the RAM 14 and cause a printing unit 18 to print the read image data.

In step S504, a current directory change request R508 is issued by the printing control module 60. To be specific, a current directory change API is called in which "T:¥¥RECV" is set as a directory designation parameter.

In step S506, a received data processing start request R510 is issued by the file management module 62. To be specific, in this embodiment, "reception" is set as the communication type parameter, and a facsimile unit opening function is called.

In step S508, setting for reading received data accumulated in the buffer memory is read to the RAM 14 is made at the facsimile unit 24 by the facsimile control module 66.

When current directory change success is noticed, the sequence S250 in FIG. 5 is executed.

When the sequence S250 is terminated, a current directory change request R528 is issued by the printing control module 60. To be specific, the current directory change API is called in which "T:" is set as the directory designation parameter.

In step S530, a received data processing termination request R530 is issued from the file management module 62. To be specific, in this embodiment, a facsimile unit closing function is called.

In step S532, setting for terminating the forwarding of received data accumulated in the buffer memory to the RAM 14 is made at the facsimile unit 24 by the facsimile control module 66.

In step S534, when printing control termination is noticed, reception printing completion is noticed to the host module from the facsimile reception job control module 54.

2-3. Report Printing Process Sequence

Figure 10:
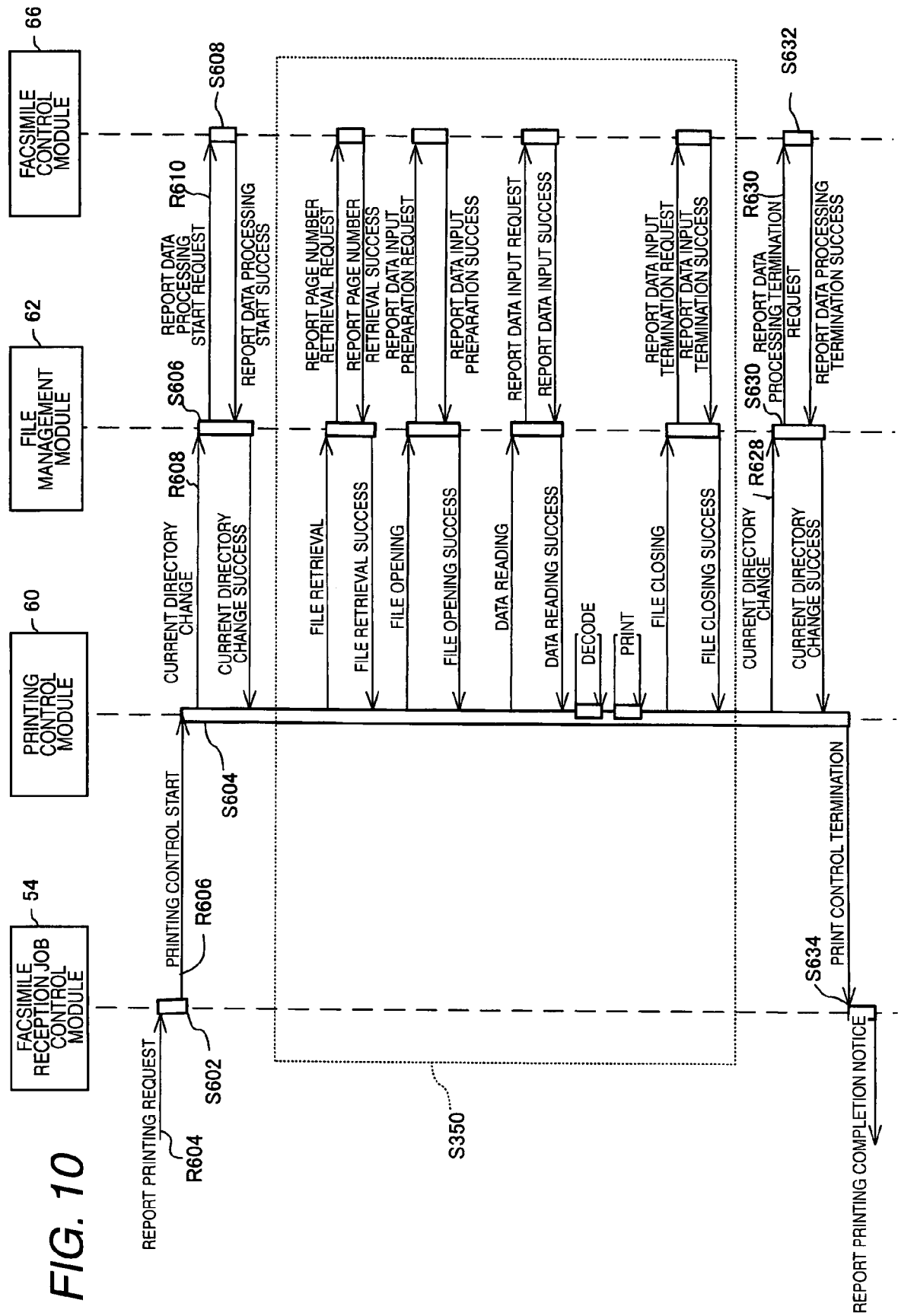
FIG. 10 is a sequence diagram according to the second embodiment.

FIG. 10 is a sequence diagram illustrating a procedure and flow of issuing requests between the modules at the time of report printing according to the second embodiment. The facsimile reception job control module 54 and the printing control module 60 in the report printing process sequence are similar to those of the receiving process sequence (the sequence S560 in FIG. 9) that has already been described except that different parameters are designated as required. By sharing the facsimile reception job control module 54 and the printing control module 60 between when the report data is printed and when the received data is printed, the reduction in program size and the reduction in development man hours can both be realized.

In step S602, a printing control start request R606 is issued in response to a report printing request R604. The printing control start request R606 is a request to read image data stored in a predetermined directory of the volume designated by the parameter to the RAM 14 and cause the printing unit 18 to print the image data.

In step S604, a current directory change request R608 is issued by the printing control module 60. To be specific, the current directory change API is called in which "T:¥¥REPORT" is set as the directory designation parameter.

In step S606, a report data processing start request R610 is issued from the file management module 62. To be specific, in this embodiment, "report printing" is set as the communication type parameter, and a facsimile unit opening function is called.

In step S608, setting for reading report data held by the facsimile unit 24 to the RAM 14 is made at the facsimile unit 24 by the facsimile control module 66.

When current directory change success is noticed, the sequence S350 in FIG. 6 is executed.

When the sequence S350 is terminated, a current directory change request R628 is issued by the printing control module 60. To be specific, the current directory change API is called in which "T:" is set as the directory designation parameter.

In step S630, a report data processing termination request is issued from the file management module 62. To be specific, in this embodiment, the facsimile unit closing function is called.

In step S632, setting for terminating the transfer of report data to the RAM 14 is made at the facsimile unit 24 by the facsimile control module 66.

In step S634, when printing control termination is noticed, report printing completion is noticed to the host module from the facsimile reception job control module 54.

As has been described heretofore, since the volume utilization request is converted into the report data input request or the received data input request in accordance with the directory designation parameters of the volume utilization request in which the volume T is designated as the volume designation parameter, the report data printing and the received data printing can be switched by changing the directory designation parameters of the volume utilization request.

According to an aspect of the invention, since the configuration is provided in which the volume utilization request is converted into the transmission data output request in accordance with the volume designation parameter of the volume utilization request, the facsimile unit can be handled as a volume as in the case of the external recording medium. Because of this, the facsimile transmission and the transmission of the scanned image to the external recording medium can share the procedures of causing the scan unit to read an image, inputting the read image into the internal memory and issuing the volume utilization request which has the external recording medium or the facsimile unit as the volume designation parameter. As a result, the reduction in program size and development man hours can be realized.

According to an aspect of the invention, since the volume utilization request is converted into the line control request in accordance with the utilization request type of the volume utilization request, the line control can also be executed using the volume utilization request.

According to an aspect of the invention, since the current directory change request which has the facsimile unit as the volume designation parameter is converted into the line connection request and the line disconnection request, as in the case where a current directory change request is issued when transmitting data read by the scan unit to a predetermined directory of the external recording medium, the facsimile unit can be caused to connect and disconnect the line by a current directory change request.

According to as aspect of the invention, since the configuration is provided in which the volume utilization request is converted into the received data input request according to the volume designation parameter of the volume utilization request, the facsimile unit can be handled as a volume as in the case of the external recording medium. Because of this, the print of facsimile received data and the print of the image stored in the external recording medium can share the procedures of issuing the volume utilization request which has the external recording medium or the facsimile as the volume designation parameter and causing the printing unit to print an image based on the data read into the internal memory in response to the volume utilization request. As a result, the reduction in program size and development man hours can be realized.

According to as aspect of the invention, since the volume utilization request is converted into the report data input request or the received data input request in response to the directory designation parameter of the volume utilization request which has the facsimile unit as the volume designation parameter, the communication history data and the communication control data can also be caused to be printed by changing the value of the directory designation parameter of the volume utilization request.

Note that the respective functions of the plurality of units according to the invention are realized by a hardware resource whose function is specified by a configuration itself, a hardware resource whose function is specified by a program or a combination thereof. In addition, the respective functions of the plurality of units are not limited to those whose functions are realized by hardware resources which are physically independent of each other.

Note that the invention is not limited the embodiments that have been described heretofore but can be applied to various embodiments without departing from the spirit and scope thereof.

What is claimed is:

1. An image processing apparatus comprising:
an internal memory;
a scan controller, operable to cause a scan unit to read an image, to input the image into the internal memory and to issue a volume utilization request that includes a facsimile unit as a volume designation parameter;
a transmission controller, operable to cause the facsimile unit to transmit data based on the image input into the internal memory in response to a transmission data output request;
a file manager, operable to receive the volume utilization request and to convert the volume utilization request into the transmission data output request to the transmission controller; and
a facsimile transmission job controller, operable to request the scan controller to issue the volume utilization request in response to generation of a facsimile transmission request.

2. The image processing apparatus according to claim 1, wherein
the file manager converts the volume utilization request into a line control request to the transmission controller in accordance with a utilization request type of the volume utilization request.

3. The image processing apparatus according to claim 2, wherein
the volume utilization request which is converted into a line connection request and a line disconnection request which are the line control request is a current directory change request.

4. The image processing apparatus according to claim 1, wherein
the volume utilization request includes an external recording medium or the facsimile unit as the volume designation parameter, and
when the volume utilization request includes the facsimile request as the volume designation parameter, the file manager converts the volume utilization request into the transmission data output request to the transmission controller.

5. An image processing apparatus comprising:
an internal memory;
a reception controller, operable to write data received by a facsimile unit on the internal memory in response to a received data input request;
a printing controller, operable to issue a volume utilization request that includes the facsimile unit as a volume designation parameter and to cause a printing unit to print an image based on the data written on the internal memory in response to the volume utilization request;

a file manager, operable to receive the volume utilization request and to convert the volume utilization request into the received data input request to the reception controller; and a facsimile reception job controller, operable to request the printing controller to issue the volume utilization request in response to an incoming call for the facsimile unit.

6. The image processing apparatus according to claim 5, further comprising a report controller, operable to write communication history data and communication control data which are held by the facsimile unit on the internal memory in response to a report data input request, wherein the file manager converts the volume utilization request into the report data input request to the report controller or the received data input request to the reception controller in accordance with a directory designation parameter which is included in the volume utilization request.

7. The image processing apparatus according to claim 5, wherein the volume utilization request includes an external recording medium or the facsimile unit as the volume designation parameter, and when the volume utilization request includes the facsimile request as the volume designation parameter, the file manager converts the volume utilization request into the received data input request to the reception controller.

8. An image processing method comprising:

causing a scan unit to read an image;

inputting data based on the image into an internal memory;

issuing a volume utilization request that includes a facsimile unit as a volume designation parameter in response to generation of a facsimile transmission request;

receiving the volume utilization request;

converting the volume utilization request into a transmission data output request; and causing the facsimile unit to transmit the data input into the internal memory in response to the transmission data output request.

9. An image processing method comprising:

issuing a volume utilization request that includes a facsimile unit as a volume designation parameter in response to an incoming call for the facsimile unit;

receiving the volume utilization request;

converting the volume utilization request into a received data input request;

writing data received by the facsimile unit on an internal memory in response to the received data input request; and causing a printing unit to print an image based on the data written on the internal memory in response to the volume utilization request.

10. A computer-readable recording medium for storing a computer program for causing execution of the method according to claim 8.

11. A computer-readable recording medium for string a computer program for causing execution of the method according to claim 9.

* * * * *